March 10, 1942.  J. D. RYDER  2,276,095

TELEMETRIC SYSTEM

Original Filed May 28, 1937  3 Sheets—Sheet 1

Inventor
JOHN D. RYDER
By Raymond D. Junkins
Attorney

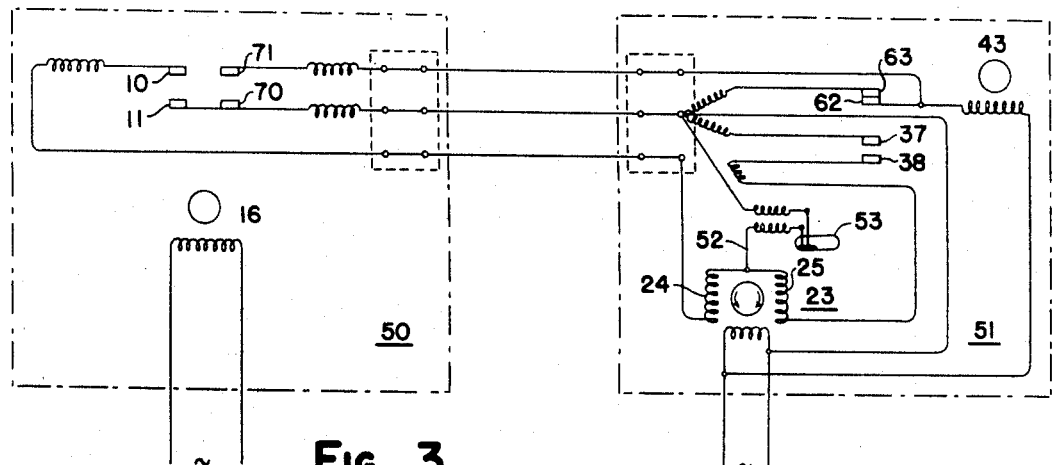
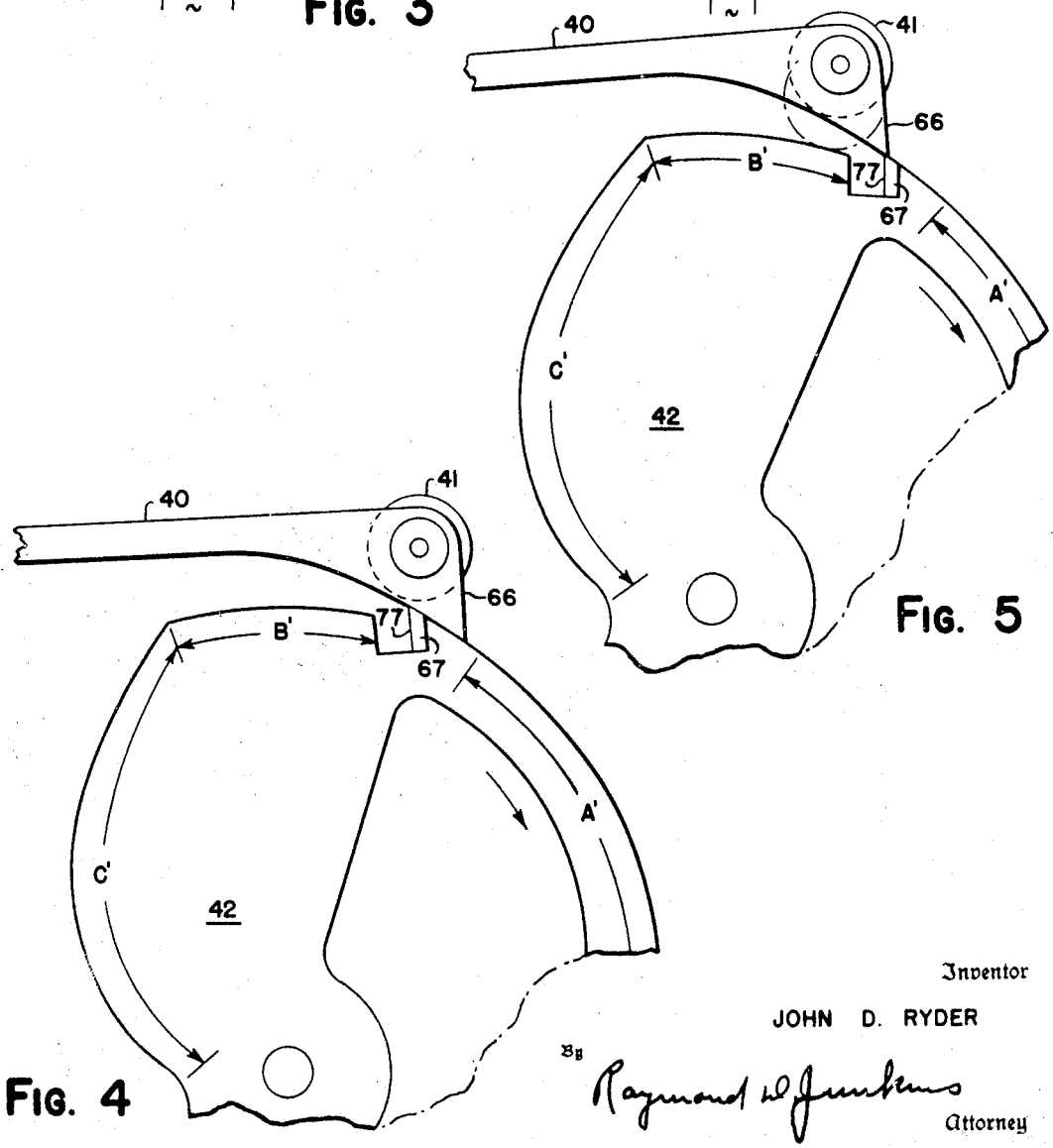

March 10, 1942. J. D. RYDER 2,276,095
TELEMETRIC SYSTEM
Original Filed May 28, 1937   3 Sheets-Sheet 3
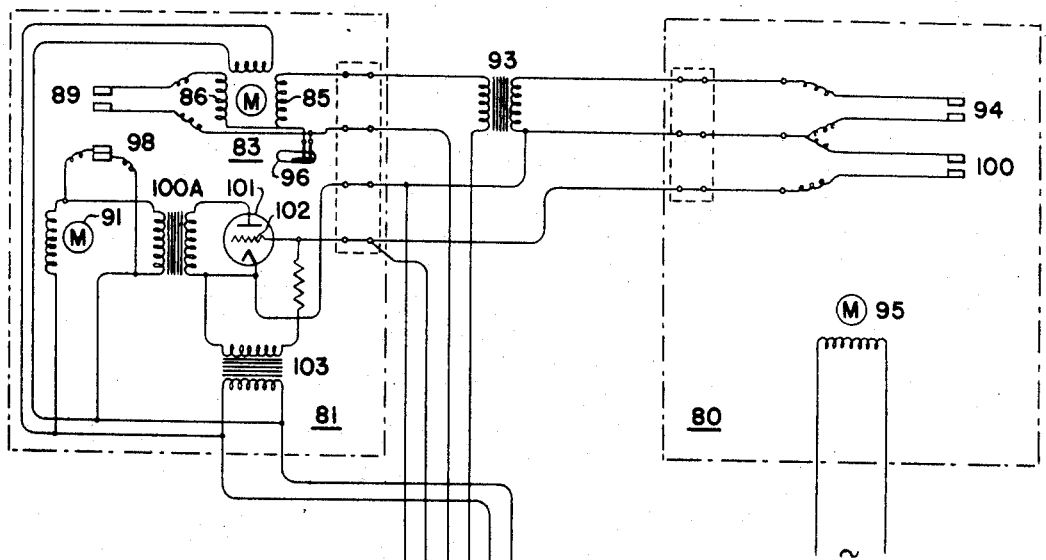
FIG. 7
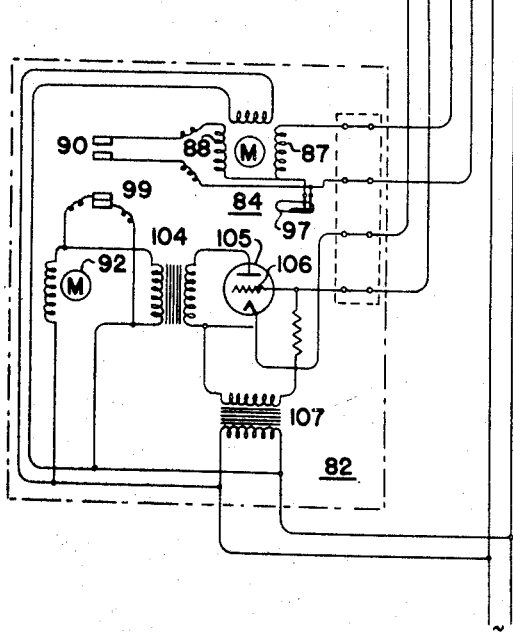
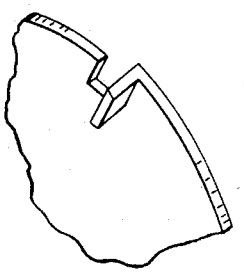
FIG. 6
Inventor
JOHN D. RYDER
By Raymond D. Junkins
Attorney Patented Mar. 10, 1942

2,276,095

UNITED STATES PATENT OFFICE 2,276,095

TELEMETRIC SYSTEM

John D. Ryder, Cleveland Heights, Ohio, assignor to Bailey Meter Company, a corporation of Delaware Original application May 28, 1937, Serial No. 145,277. Divided and this application February 8, 1940, Serial No. 317,844

10 Claims. (Cl. 172—293)

This invention relates to telemetric systems for remotely indicating or otherwise exhibiting the magnitude of a variable.

In accordance with my invention periodic electric impulses of a time length proportional to or in relation to the magnitude of the variable originate at a transmitting station. In consonance with these impulses similar electric impulses originate in a receiving station of a time length proportional to or in relation to the position of the indicator or other exhibiting means, and the position of the indicator is varied to maintain the transmitting and receiving impulses of equal time length.

One feature of my invention resides in the mechanisms employed at the transmitting and receiving stations whereby the electric circuits for originating the electric impulses are closed through individual contacts, but simultaneously opened through a common switch.

A further feature resides in the mechanical linkage employed at the transmitting and receiving stations whereby angularity is eliminated and movements of the indicator at all times agree precisely with movements of the device sensitive to the variable.

Still another feature resides in the simple means provided for maintaining the cyclically operable means employed at the transmitter and receiver for originating the electric impulses in exact phase.

A further feature resides in the means provided for eliminating the effects of backlash on such cyclically operable means as may be present in the gear reduction incorporated in the driving mechanisms therefor.

In the drawings:

Fig. 3 is a wiring diagram of the arrangements of Figs. 1 and 2.

Figs. 4, 5 and 6 are details of cams of Figs. 1 and 2.

Fig. 7 is a wiring diagram for one transmitter and two receivers.

Figures 1, 2:
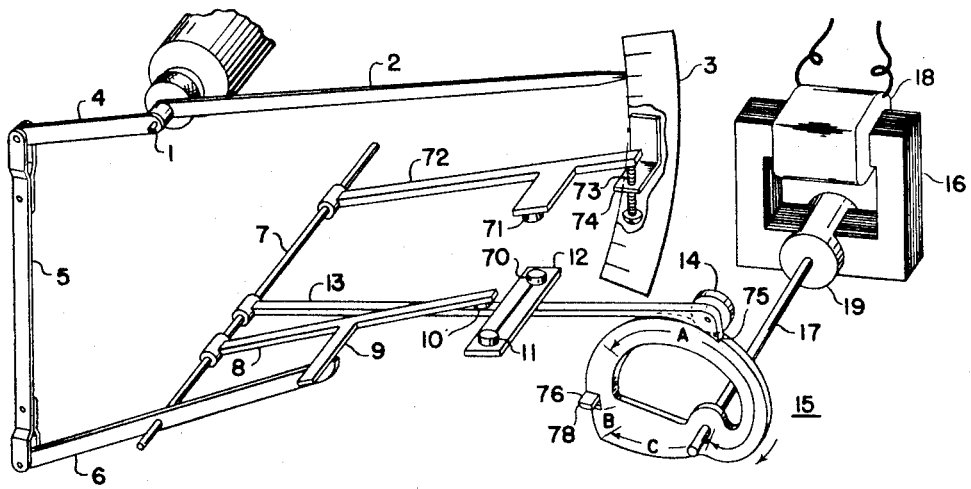
Fig. 1 illustrates in somewhat diagrammatic fashion, a transmitting mechanism.
Fig. 2 illustrates in similar manner, a receiving mechanism.

Referring to Fig. 1, I have shown a transmitting station in which is a spindle 1 angularly positioned by a device (not shown) responsive to the variable, the magnitude of which it is desired to remotely indicate, record or otherwise exhibit. For example, the spindle 1 may be positioned by a rate of flow meter sensitive to the differential produced by an orifice or other primary element and varying in known relation to the rate of fluid flow therethrough, or it may be positioned by a Bourdon tube sensitive to pressure or temperature. In other instances it may be positioned manually, so that commands, orders, or other intelligence may be transmitted to the receiving station.

Secured to the spindle 1 is an index 2, which in cooperation with a suitably graduated scale 3 gives an indication of the magnitude of the variable at the transmitting station. Likewise secured to the spindle 1 is an arm 4 pivotally connected through a link 5 to a transmitting arm 6 angularly positionable about a shaft 7. Angular movements of the spindle 1 are, therefore, mechanically transmitted to the arm 6. Also mounted on the shaft 7 is a member 8 having a projection 9 normally resting by gravity on the arm 6. As the arm 6 is positioned about the shaft 7 the member 8 is also positioned through the agency of the projection 9.

Carried by the member 8 is a contact 10 arranged to engage a cooperating contact 11 secured to a plate 12 mounted on a follower arm 13, one end of which is pivotally supported by the shaft 7. The opposite end of the follower 13 is provided with a pin on which is rotatably mounted a cam follower 14 engaging the contour of a cam 15, continuously rotated in the direction of the arrow by a synchronous motor 16 through a shaft 17. The motor 16 is energized through a field winding 18 which may be connected to any suitable source of alternating current and is provided with an integral gear reduction unit 19, so that the shaft 17 rotates at a relatively low speed.

The follower 13, through the cam 15, is periodically oscillated between predetermined limits. At some point in its travel, depending upon the position of the arm 6, the member 8 is picked up and carried to the upper travel limit, whence the member 8 is returned to its normal position when the extension 9 engages the arm 6. The rising section of the cam 15 designated by the angle A in Fig. 1 is substantially uniform, so that the increment of time during which the contact 10 is in engagement with the contact 11 while the follower 14 engages this section of cam 15 bears a functional relation to the magnitude of the variable angularly positioning the spindle 1.

In Fig. 2 is shown a receiving station in some respects similar to the transmitting station in which is an index 20 pivotally supported by a shaft 21 and cooperating with a suitably graduated scale 22 to remotely indicate the magnitude of the variable angularly positioning the spindle 1. The index 20 is positioned by a reversible motor 23 having opposed wound split shading poles 24 and 25. If the pole 24 is short circuited the motor 23 rotates in one direction. If the pole 25 is short circuited the motor rotates in the opposite direction. With both poles simultaneously energized or deenergized the motor is not urged to rotation. The motor 23 is provided with a gear reduction 26 so that a crank arm 27 positioned by the output shaft of the gear reduction moves through a relatively small angle for a large angular motion of the motor.

The crank arm 27 positions the index 20 through a receiving arm 28 pivoted on a shaft 29 and provided with a slot 30. A block 31 adjustable radially with respect to the shaft 29 by a screw 32 is guided in the slot 30 and is pivotally connected to a link 33 likewise pivotally connected to the index 20. Movement of the block 31 toward the shaft 29 serves to decrease the angular motion of the index 20 for a given angular motion of the crank 27. Conversely movement of the block 31 away from the shaft 29 serves to increase the movement of the index 20 for a given movement of the crank 27. Through the agency of this adjustment any desired angular travel of the index 20 may be obtained for a given angular travel of the index 2.

The receiving arm 28 is provided with an extension 34 upon which normally rests by gravity an extension 35 of a member 36 movably mounted on the shaft 29. Carried by the member 36 is a contact 37 arranged to engage a cooperating contact 38 secured to a plate 39 mounted on a follower arm 40 pivoted about the shaft 29. The arm 40 through a rotatable follower 41 is periodically oscillated between predetermined limits by a cam 42 continuously rotated by a self-starting synchronous motor 43 through a shaft 44. The motor 43 is similar to the motor 16 and is provided with an integral gear reduction 45 so that cams 15 and 42, identical in contour, rotate in synchronism with each other. The cam 42 is provided with a rising section A' similar to section A of cam 15, so that the increment of time during which contact 37 is in engagement with contact 38, while the follower 41 engages section A' bears a functional relation to the position of the index 20.

Referring to Fig. 3, the transmitter is generally indicated at 50 and the receiver at 51. When contacts 10, 11 engage, the pole winding 24 of motor 23 is short circuited, thereby tending to produce rotation in one direction. Similarly when contacts 37, 38 engage, winding 25 of motor 23 is short circuited, tending to produce rotation in the opposite direction. When the position of index 20 agrees with that of index 2, contacts 10, 11 and 37, 38 engage at the same instant and motor 23 remains stationary. If the index 2 is positioned downwardly a predetermined amount by the spindle 1, then contacts 10, 11 will engage prior to engagement of contacts 37, 38 and motor 23 will rotate in a direction to position the receiving arm 28 in a clockwise direction, so that index 20 is positioned downwardly. Until indices 2 and 20 are brought into proper correspondence contacts 10, 11 will continue to engage prior to contacts 37, 38 and during each cycle of operation motor 23 will operate to position the receiving arm 28 in a clockwise direction until proper correspondence is restored. Conversely, if the index 2 is positioned upwardly, then contacts 37, 38 will engage prior to contacts 10, 11 and the motor 23 will rotate to position the receiving arm 28 in a counterclockwise direction, thereby positioning the index 20 upwardly and such upward positioning will continue for an increment of each cycle of operation until proper correspondence is restored.

The windings 24, 25 are shown connected to a common neutral 52, in which is located a mercury switch 53. As shown in Figs. 2 and 3 the mercury switch 53 is in closed position. However, upon the follower 40 being positioned upwardly to the termination of the cam section A' the mercury switch 53 is thrown to open position, thereby simultaneously open circuiting the windings 24, 25 notwithstanding that contacts 10, 11 and 37, 38 remain engaged. As shown in Fig. 2 the mercury switch 53 is pivotally supported on a shaft 54 mounted in a stationary bracket 55. Likewise supported on the shaft 54 is a beam 56 pivotally connected to the arm 40 through a link 57. Mounted in the base of the mercury switch 53 are adjustable screws 60 and 61 arranged to engage the beam 56. The screws 60 and 61 are adjusted so that upon the mercury switch 53 being thrown to open position it will remain open until the follower approaches the origin of the rising section A' when it is restored to the closed position, so that windings 24 and 25 will be energized upon engagement of contacts 10, 11 and 37, 38 respectively.

It is apparent from the foregoing description of the operation of mercury switch 53 that the shape of cams 15 and 42 after the terminus of rising sections A and A' respectively are passed has no effect upon the operation of motor 23, for regardless of when the contacts 10, 11 and/or 37, 38 disengage the motor remains stationary as the neutral has been opened. The windings 24, 25 are therefore only short circuited through contacts 10, 11 and 37, 38 respectively, whereas they are open circuited through mercury switch 53. As known, contacts such as 10, 11 and 37, 38 when used to deenergize a circuit may cause sparking, which is not only injurious to the contacts but, if surrounded by an explosive atmosphere, may cause serious explosions. Engagement of contacts 10, 11 and 37, 38 energizing the windings 24 and 25 creates negligible sparking. The mercury switch 53 is confined within a controlled atmosphere so that sparking occurring therein in no way disturbs the operation of the system or gives rise to explosion hazards.

As hereinbefore stated, cams 15 and 42 operate in synchronism and in exact phase, so that the point on the contour of cam 42 engaged by follower 41 agrees exactly with the point on the contour of cam 15 engaged by follower 14. When initially placing the device in operation, or after a power failure, a phase displacement between cams 15 and 42 may exist. To restore the desired phase I provide means for comparing the position of cam 42 once each revolution with the position of cam 15, and if displaced therefrom retarding the motor 43 until proper phase is restored. Once restored cams 15, 42 will remain in phase inasmuch as in the preferred embodiment they are driven by similar synchronous motors.

The motor 43 is normally energized through closed contacts 62, 63. A bracket 64 supports the contact 62, whereas the contact 63 is carried by a member 65 pivotally mounted on the shaft 29. Once each revolution of the cam 42 an extension 66 on the arm 40 engages a laterally extending lip 67 on cam 42. Such engagement causes the roller 41 to be raised above the cam 42 and for an anvil 68 to engage an adjustable screw 69 carried by the member 65. The member 65 is then oscillated about shaft 29 sufficient to cause disengagement of contacts 62, 63, thereby opening the circuit normally energizing the motor 43.

Connected in parallel with contacts 62, 63 are contacts 70, 71. The contact 70 is carried by the plate 12, whereas the contact 71 is carried by a member 72 pivotally mounted on shaft 7 and normally supported at the opposite end by an adjustable screw 73 carried by a fixed bracket 74. The member 13 is provided with a projection 75 arranged to engage a lip 76 on cam 15. Engagement of the projection 75 with the lip 76 raises the member 13 sufficiently so that contact 70 engages contact 71, thereby serving to energize the motor 43.

If cams 15, 42 are in phase, contacts 70, 71 will engage at the instant contacts 62, 63 disengage, and contacts 62, 63 will reengage at the instant contacts 70, 71 disengage, thereby effecting continuous energization of the motor 43. Should the cam 42 lead the cam 15, contacts 62, 63 will open before contacts 70, 71 engage and the motor 43 will be deenergized for a short interval each revolution of cam 42, retarding the same a small amount at each operation until the opening of contacts 62, 63 occurs at the instant contacts 70, 71 close and cams 42, 15 are brought into phase. If cam 42 lags cam 15, contacts 62, 63 will remain open after the contacts 70, 71 have disengaged, interrupting the receiver motor circuit every revolution until cam 42 is sufficiently retarded so that motor 43 will not coast to a closed position of contacts 62, 63. Cam 42 will then be stationary for one revolution of cam 15, or until contacts 70, 71 again close, at which time the motor 43 will be energized and cam 42 will lead cam 15. Thereafter motor 43 will be deenergized for a short interval in each revolution of cam 42 until proper phase relationship is again restored.

In Fig. 4 I have shown the cam 42 and associated parts in the position occupied at the beginning of the phasing operation. The projection 66 is in engagement with the lip 67 and roller 41 is raised from cam 42. At approximately this instant as determined by the adjustment of screw 69 contact 62 disengages contact 63. In the transmitter, if cams 42 and 15 are in phase, at this same instant cam 15 and associated parts occupy the same relative positions as shown in Fig. 4, and contacts 70, 71 engage. It will be observed that at this instant when roller 41 leaves cam 42 its center is still to the right of radial edge 77 of cam 42. With cam 42 rotating in the direction of the arrow it is apparent that any backlash present in gear reduction unit 45, would upon roller 41 rolling over edge 77, cause cam 42 to jump forward. By providing that the roller 41 is lifted from the contour of cam 42 before its center is on a radial line with edge 75 such imperfect operation is eliminated, the extension 66 dragging on the lip 67 serving to maintain the backlash present in the gear reduction unit 45 in the same direction.

In Fig. 5 are shown the relative locations of cam 42 and associated parts at the termination of the phasing period. Roller 44 has passed completely beyond the radial edge 77 of cam 42 and extension 66 is just about to drop over edge 77. The follower 41 will fall to a constant radius section B', as shown clearing entirely the edge 77. The radial edge 77 forming a sheer drop to the constant radius section B' provides a means for disengaging contacts 62, 63 at an exact point in the angular travel of cam 42, thereby facilitating the adjustment of contacts 62, 63 relative to contacts 70, 71. If desired edge 77 may be slightly undercut, so that the possibility of engagement of extension 66 therewith during its drop to constant radius section B' will be avoided.

By providing the constant radius section B', reaction on the motor 43 and gear reduction 45 due to the impact of the falling parts which would otherwise be present is also avoided. A falling section C' of cam 42 extends from the terminus of constant radius section B' to the origin of the rising section A', and serves to carry member 40 to its initial or starting position.

Cam 15 is identical with cam 42, an edge 78 forming a sheer drop to a constant radius section B, which is followed by a falling section C extending to the origin of rising section A. The operation therefor of cam 15 and associated parts is exactly similar to that described with reference to cam 42 and illustrated in Figs. 4 and 5.

As previously described, mercury switch 53 is thrown to open position at the terminus of section A' of cam 42. The exact location of the terminus of section A' is unimportant so long as it occurs before projection 66 engages lip 67. It will be observed that during phasing operation, therefore, motor 23 is deenergized so that if because cams 15 and 42 are out of phase motor 43 is stopped momentarily or for one revolution of cam 15, incorrect positioning of index 20 will not occur.

Referring now to Fig. 7 I have therein shown a single transmitter 80 arranged to control a plurality of receiving stations generally indicated at 81 and 82. I have shown two receiving stations coupled with a single transmitting station merely for purposes of illustration and it will be obvious from the following description that a single transmitting station may be coupled with any number of receiving stations located remotely therefrom and from each other.

The mechanism within transmitting station 80 is identical with that shown in Fig. 1 and the mechanism within the receiving stations 81 and 82 is identical with that shown in Fig. 2. Within the receiving stations 81 and 82 are reversible motors 83 and 84 respectively, corresponding to motor 23. The motor 83 has opposed windings 85 and 86 respectively, whereas motor 84 has opposed windings 87 and 88. Windings 86 and 88 are periodically energized through closure of contacts 89 and 90 respectively, periodically oscillated by motors 91 and 92, corresponding to motor 43. Opposed windings 85, 87 are connected in series with each other and with the primary of a transformer 93. The secondary of the transformer 93 is periodically short circuited by contacts 94 closed by motor 95 corresponding to motor 16 in Fig. 1.

In operation contacts 89 and 90 are periodically closed for increments of time depending upon the position of the indices (not shown) moved by motors 83 and 84 respectively. Concurrently therewith windings 85 and 87 are simultaneously energized through closure of contacts 94. The increment of time during which contacts 94 are closed is, as hereinbefore described, dependent upon the magnitude of the variable being measured. Through the agency of the transformer 93 the potential across the contacts 94 may be maintained at a relatively low value when normal potential exists across windings 85 and 87.

Included in the neutral winding of motors 83 and 84 are mercury switches 96 and 97 respectively, periodically thrown to open position as described with reference to mercury switch 53 shown in Fig. 2.

To maintain motors 91 and 92 in proper phase relationship with motor 95 I show within receiving station 81 normally closed contacts 98 and within receiving station 82 normally closed contacts 99, corresponding to contacts 62, 63 as shown in Fig. 2. Periodically contacts 98, 99 are open circuited. Simultaneously contacts 100 within transmitter station 80 engage, serving to maintain continuous energization of motors 91 and 92 if they are in proper phase relationship with motor 95.

Connected in parallel with contacts 98 across motor 91 is the primary of a transformer 100A, the secondary of which is connected in the output circuit of an electron discharge device 101. The grid 102 is normally biased through a transformer 103 to maintain the output circuit de-energized. Closure of contacts 100 acts, however, to change the grid bias and render the electron discharge device 101 conducting, thereby reducing the impedance of the primary of the transformer 100A sufficiently so that motor 91 is energized. Accordingly, if operation of contacts 98 and 100 occur in proper sequence motor 91 will be continuously energized. If however due to lack of proper phase such sequential operation does not occur, the motor 91 will be retarded until proper phase relationship with respect to motor 95 is restored.

Within receiving station 82 is a similar arrangement for maintaining proper phase relationship between motors 92 and 95. Connected in parallel with the contacts 99 across motor 92 is the primary of a transformer 104, the secondary of which is connected in the output circuit of an electron discharge device 105, having a grid 106. Normally biased by means of a transformer 107 to render the output circuit non-conducting. The grid 106 is connected in parallel with grid 102 across contacts 100. Closure of contacts 100 acts therefore to simultaneously change the bias of grid 106, as well as grid 102. The change in bias of grid 106 serves to reduce the impedance of the primary winding of transformer 104 sufficiently so that motor 92 is energized.

Normally, therefore, motors 91 and 92 are energized by contacts 98 and 99 respectively. Periodically these contacts disengage, so that if motor 91 or motor 92 is not in phase with motor 95 it is retarded. Normally, however, contacts 100 will engage during the increment of time contacts 98 and 99 are disengaged, so that motors 91 and 92 are continuously energized.

While I have described my invention and preferred embodiments thereof, I desire it to be understood that I am not to be limited thereby except as to the claims in view of the prior art.

This application is a division of my copending application Serial No. 145,277 filed May 28, 1937 which issued as Patent No. 2,211,711, dated Aug. 13, 1940.

What I claim as new, and desire to secure by Letters Patent of the United States, is:

1. In a telemetric system, in combination, a transmitting and a receiving station, identical rotatable cams located in said transmitting and receiving stations having a rising section and a falling section, an oscillatable member periodically reciprocated by each of said cams, a synchronous motor for driving each of said cams and means for maintaining said cams in phase comprising, a laterally extending lip on each of said cams at the juncture of said rising and falling sections, a projection on each of said members adapted to engage said lips, and means actuated by engagement of the projection on said members with said lips for controlling the energization of said one of said synchronous motors.

2. In a telemetric system, in combination, a transmitting and a receiving station, identical rotatable cams located in said transmitting and receiving stations having a rising section, a laterally extending lip at the terminus of said rising section, a sheer drop following said lip, a constant radius section and a falling section to the origin of said rising section, a synchronous motor for driving each of said cams, and means for maintaining the receiving cam in phase with said transmitting cam comprising, an oscillatable member having a follower normally engaging each of said cams, a projection on each of said members arranged to engage said lips when said followers approach the terminus of the rising sections of said cams disengaging said followers from said cams until said projections pass said lips whereby said followers drop to said radial sections, normally open contacts under the control of the oscillatable member engaging one of said cams closed while its projection engages the lip of said cam, normally closed contacts under the control of the other of said oscillatable members opened while its projection engages the lip of the other of said cams, and an electrical network whereby one of said motors is energized through engagement of either of said contact means.

3. In a telemetric system, in combination, a transmitting and a receiving station, a rotatable cam in said transmitting and receiving stations, a synchronous motor for driving each of said cams, a member periodically oscillated by each of said cams, and means for maintaining said cams in predetermined phase relationship comprising, a laterally extending lip on each of said cams, a projection carried by each of said members for engaging said lips, a circuit for energizing one of said synchronous motors, means actuated by engagement of said projections with said lips for controlling the energization of said one of said synchronous motors.

4. A telemetric system for remotely exhibiting the magnitude of a variable, comprising, a transmitting station and a plurality of receiver stations, cyclically operable means in said transmitting station and each of said receiver stations, a synchronous motor for operating each of said cyclically operable means, and means for maintaining all of said receiving cyclically operable means in proper phase relation with said transmitting cyclically operable means comprising, an electric circuit for each of said synchronous motors, a transformer in each of said receiving stations having a primary and a secondary, the primary connected in the electric circuit in series with the synchronous motor in the receiving station, a normally closed switch in each of said receiving stations connected in parallel with the primary of the transformer therein, a normally open switch in said transmitting station adapted to simultaneously short circuit the secondaries of all of said transformers when closed, means operated by the synchronous motor in each of said receiving stations for opening the normally closed switch therein for an increment of time during each cycle of operation, and means in said transmitting station for closing said normal open switch during each cycle of operation for a like increment of time so that if a receiver cyclically operable means is in proper phase relation with the transmitting cyclically operable means the synchronous motor driving the former is continuously energized.

5. A telemetric system for remotely exhibiting the magnitude of a variable, comprising, a transmitting station and a plurality of receiving stations, cyclically operable means in said transmitting station and each of said receiving stations, a synchronous motor for operating each of said cyclically operable means, and means for maintaining all of said receiving cyclically operable means in proper phase relation with said transmitting cyclically operable means comprising, an electric circuit for each of said receiving synchronous motors, a transformer in each of said receiving stations having a primary and a secondary, the respective primaries being connected in said electric circuit in series with said motors, normally closed circuit controlling means connected in parallel with each of said primaries, means under the control of the associated synchronous motor for periodically opening the respective circuit controllers, means for maintaining the secondaries of said transformers normally open-circuited, and means for periodically closing the circuits through the secondaries of all of said transformers under the control of the synchronous motor in said transmitting station to thereby pass current through said primaries when said circuit controllers are open and said receiving station motors are in phase with the motor of the transmitting station.

6. A telemetric system for remotely exhibiting the magnitude of a variable, comprising, a transmitting station and a plurality of receiving stations, cyclically operable means in said transmitting station and each of said receiving stations, a synchronous motor for operating each of said cyclically operable means, and means for maintaining all of said receiving cyclically operable means in proper phase relationship with said transmitting cyclically operable means comprising, an electric circuit for each of said receiving motors having a plurality of parallel branches connected in series with the respective motors, normally closed contact means in one of said branches at each receiving station, means under the control of the respective receiving synchronous motors for periodically opening said contacts, means in the other branch of each motor circuit for normally maintaining said other branches substantially non-conducting, and means under the control of the transmitting synchronous motor for periodically rendering the said other branches conducting when said contacts are open whereby to maintain constant energization of said receiving motors so long as they are in phase with the transmitting motor.

7. A telemetric system for remotely exhibiting the magnitude of a variable, comprising a transmitting station and a plurality of receiving stations, cyclically operable means in said transmitting station and each of said receiving stations, a synchronous motor for operating each of said cyclically operable means, and means for maintaining all of said receiving cyclically operable means in proper phase relationship with said transmitting cyclically operable means comprising, an electric circuit for each of said receiving motors having a plurality of parallel paths connected in series with the respective motors, normally closed contact means in one of said branches at each receiving station, means under the control of the respective receiving synchronous motors for periodically opening said contacts, means in the other branch of each motor circuit for normally maintaining said branch substantially non-conducting, an electron discharge device having an input and an output circuit at each receiving station, means for rendering said other branches at each receiving station conductive in response to the flow of current in the output circuit of said device, and means for periodically controlling the energization of the input circuits of all of said electron discharge devices under the control of the synchronous motor at the transmitting station to render conducting said other branches when said contacts are open whereby to constantly energize all of said synchronous motors at the receiving station so long as they are in phase with the synchronous motor at the transmitting station.

8. A telemetric system for remotely exhibiting the magnitude of a variable comprising a transmitting station and a plurality of receiving stations, cyclically operable means in said transmitting station and each of said receiving stations, a synchronous motor for operating each of said cyclically operable means, and means for maintaining all of said receiving cyclically operable means in proper phase relationship with said transmitting cyclically operable means comprising, an electric circuit for each of said receiving motors having a plurality of parallel branches connected in series with the respective motors, normally closed contact means connected in one of said branches at each of the receiving stations, means under the control of the respective receiving motors for periodically opening said contacts, a transformer at each receiving station having a primary and a secondary winding, the primaries of said transformers being respectively connected in the others of said branches, an electron discharge device at each receiving station having a grid, a cathode and an anode, the secondary of each of said transformers connected to said cathode and anode of the respective electron discharge devices, means normally maintaining said electron discharge devices non-conducting, and means for periodically and simultaneously varying the grid-cathode potential of all of said electron discharge devices under the control of said transmitting station to render all of said electron discharge devices conducting when said contacts are open, whereby to maintain said receiving station synchronous motors constantly energized when they are in phase with the synchronous motor of the transmitting station.

9. A telemetric system, comprising, a transmitting station and a plurality of receiving stations, cyclically operable means in said transmitting station and each of said receiving stations, a synchronous motor for operating each of said cyclically operable means, and means for maintaining all of said receiving cyclically operable means in proper phase relation with said transmitting cyclically operable means comprising, an electric circuit for each of said receiving motors including an impedance in series with the respective motors, a shunt connection around each impedance including a normally closed switch, means operated by the synchronous motor in each receiving station for opening the normally closed switch therein for a predetermined increment of time during each cycle of operation, means for normally maintaining the impedance branch of each electric circuit substantially non-conducting, a normally open switch in said transmitting station, means operated by the synchronous motor therein for closing said normally open switch for a like increment of time during each cycle of operation, and means under the control of the switch in the transmitting station for rendering said impedance branches of all of said circuits conducting during the increment of time when the switch in the transmitting station is closed so that each receiving synchronous motor in proper phase relation with the transmitting synchronous motor is continuously energized throughout each cycle of operation.

10. A telemetric system, comprising, a transmitting station and a plurality of receiving stations, cyclically operable means in each transmitting station and each of said receiving stations, a synchronous motor for operating each of said cyclically operable means, and means for maintaining all of said receiving cyclically operable means in proper phase relation with said transmitting cyclically operable means comprising, an electric circuit for each of said receiving motors including an impedance in series with the respective motors, a shunt connection around each impedance including a normally closed switch, means for normally maintaining the impedance branch of each electric circuit substantially non-conducting, an electron discharge device at each receiving station, said electron discharge devices having their respective output circuits electrically coupled to the respective impedance branches, means operated by each receiving synchronous motor for opening said normally closed switch during each cycle of operation for an increment of time, and means operated by the synchronous motor in the transmitting station for simultaneously controlling the input circuits of all of said electron discharge devices to render said electron discharge devices conducting and thereby render said impedance branches conducting for a like increment of time so that if the cyclically operable means in a receiving station is in proper phase relation with the cyclically operable means in the transmitting station the synchronous motor in the former is continuously energized.

JOHN D. RYDER.